(12) United States Patent
Zünd et al.

(10) Patent No.: US 10,759,074 B2
(45) Date of Patent: Sep. 1, 2020

(54) SYSTEM FOR CUTTING OF CUTTING STOCK

(71) Applicant: Zünd Systemtechnik AG, Altstätten (CH)

(72) Inventors: Oliver Zünd, Lüchingen (CH); Daniel Ledergerber, Rebstein (CH)

(73) Assignee: Zünd Systemtechnik AG, Altstätten (CH)

( * ) Notice: Subject to any disclaimer, the term of this patent is extended or adjusted under 35 U.S.C. 154(b) by 222 days.

(21) Appl. No.: 15/630,302

(22) Filed: Jun. 22, 2017

(65) Prior Publication Data

US 2017/0368706 A1 Dec. 28, 2017

(30) Foreign Application Priority Data

Jun. 24, 2016 (EP) .................................. 16176288

(51) Int. Cl.
*B26D 5/00* (2006.01)
*G06F 3/01* (2006.01)
(Continued)

(52) U.S. Cl.
CPC ............... *B26D 5/007* (2013.01); *B26D 5/34* (2013.01); *B26D 7/015* (2013.01); *B26D 7/20* (2013.01);
(Continued)

(58) Field of Classification Search
CPC .......... B26D 5/007; B26D 5/34; B26D 7/015; B26D 7/20; B26F 1/3806; B26F 1/3813;
(Continued)

(56) References Cited

U.S. PATENT DOCUMENTS 3,803,960 A * 4/1974 Pearl ........................ B26D 5/00
83/56
3,887,903 A * 6/1975 Martell ..................... G06T 3/00
700/132
(Continued)

FOREIGN PATENT DOCUMENTS

DE 3519806 A1 * 8/1986 ............... B26D 5/00
EP 2527103 A1 11/2012
(Continued)

OTHER PUBLICATIONS

EP 16 17 6288 European Search Report, dated Jan. 4, 2017, pp. 1-8.
(Continued)

*Primary Examiner* — Ghassem Alie
*Assistant Examiner* — Bharat C Patel
(74) *Attorney, Agent, or Firm* — Muncy, Geissler, Olds & Lowe, P.C.

(57) ABSTRACT

The invention relates to a system made of an electronic display device having a display screen for displaying augmented reality, an electronic memory, and a cutting device for cutting planar cutting stock, e.g., paperboard, corrugated cardboard, film, textile, plastic, foam, or wooden slabs or sheets. The system has a computer unit for computing a position and alignment of the display device in relation to the cutting device. The display device is designed to be worn by a user and positioned in the field of vision of the user. The system is designed to display to the user retrieved cutting-stock-related information by means of the display screen in a manner readable by the user in the field of vision of the user, adapted to the position and alignment of the display device in relation to the cutting device, and linked to an actual and/or setpoint position of the cutting stock.

24 Claims, 4 Drawing Sheets

(51) Int. Cl.
| | |
|---|---|
| *B26F 1/38* | (2006.01) |
| *D06H 7/24* | (2006.01) |
| *B26D 5/34* | (2006.01) |
| *D06H 3/08* | (2006.01) |
| *G06F 3/03* | (2006.01) |
| *G06F 3/042* | (2006.01) |
| *B26D 7/01* | (2006.01) |
| *B26D 7/20* | (2006.01) |
| *G06K 9/00* | (2006.01) |
| *C14B 5/00* | (2006.01) |
| *G06T 7/73* | (2017.01) |
| *G06T 11/60* | (2006.01) |

(52) U.S. Cl.
CPC ............ *B26F 1/3806* (2013.01); *D06H 3/08* (2013.01); *D06H 7/24* (2013.01); *G06F 3/011* (2013.01); *G06F 3/017* (2013.01); *G06F 3/0304* (2013.01); *G06F 3/0425* (2013.01); *G06K 9/00671* (2013.01); *B26F 1/3813* (2013.01); *C14B 5/00* (2013.01); *G06T 7/74* (2017.01); *G06T 11/60* (2013.01); *G06T 2207/20221* (2013.01); *G06T 2207/30164* (2013.01)

(58) Field of Classification Search
CPC .... C14B 5/00; D06H 3/08; D06H 7/24; G06F 3/011; G06F 3/017; G06F 3/0304; G06F 3/0425; G06K 9/00671; G06T 11/60; G06T 2207/20221; G06T 2207/30164; G06T 7/74
USPC ....... 83/365; 700/83, 122, 127, 167, 180, 57
See application file for complete search history.

(56) References Cited

U.S. PATENT DOCUMENTS

| | | | | |
|---|---|---|---|---|
| 4,583,181 A * | 4/1986 | Gerber | .................. | A41H 43/00 700/143 |
| 4,901,359 A * | 2/1990 | Bruder | ................... | B26D 5/00 235/462.01 |
| 4,941,183 A * | 7/1990 | Bruder | ................... | A41H 3/007 382/111 |
| 4,982,437 A * | 1/1991 | Loriot | ................... | B26D 5/005 356/71 |
| 5,189,936 A * | 3/1993 | Gerber | .................. | B26D 7/018 198/851 |
| 5,258,917 A * | 11/1993 | Bruder | ................... | B23K 26/032 348/125 |
| 5,663,885 A * | 9/1997 | Stahl | ........................ | B26D 5/00 700/134 |
| 5,744,776 A * | 4/1998 | Bauer | ................... | B23K 26/03 219/121.7 |
| 5,757,950 A * | 5/1998 | Bruder | ................... | B26D 5/00 382/111 |
| 5,806,390 A * | 9/1998 | Pomerleau | ............... | B26D 5/00 700/130 |
| 5,831,857 A * | 11/1998 | Clarino | .................. | B26D 5/007 700/135 |
| 6,205,370 B1 * | 3/2001 | Blaimschein | ............ | B26D 5/00 700/134 |
| 6,293,677 B1 * | 9/2001 | Gallucci | .................. | B26D 5/00 353/28 |
| 6,346,929 B1 * | 2/2002 | Fukushima | ............. | G06F 3/013 345/156 |
| 6,941,248 B2 * | 9/2005 | Friedrich | ............. | G05B 19/409 382/103 |
| 7,110,909 B2 * | 9/2006 | Friedrich | ............. | G05B 15/02 702/150 |
| 7,153,203 B2 * | 12/2006 | Pfarr | .................. | B23K 26/0838 452/150 |
| 7,324,081 B2 * | 1/2008 | Friedrich | ............. | G05B 19/409 345/156 |
| 7,714,895 B2 * | 5/2010 | Pretlove | .................. | B25J 9/1656 348/115 |
| 7,852,355 B2 * | 12/2010 | Friedrich | ................ | G06F 3/012 345/632 |
| 7,912,571 B2 * | 3/2011 | Hama | ...................... | B26D 5/00 700/134 |
| 8,261,256 B1 * | 9/2012 | Adler | .................... | G06F 1/1626 717/173 |
| 8,295,555 B2 * | 10/2012 | Campbell, Jr. | ........ | B26D 5/007 353/121 |
| 8,594,814 B2 * | 11/2013 | Rovaglio | ............... | G05B 17/02 700/83 |
| 8,612,511 B2 * | 12/2013 | Friedrich | ............. | G05B 19/409 709/203 |
| 9,001,427 B2 * | 4/2015 | Jacobs | ................. | G02B 27/017 359/630 |
| 9,038,127 B2 * | 5/2015 | Hastings | .................. | G06F 21/10 726/1 |
| 9,070,055 B2 * | 6/2015 | Miller | ................... | G06K 15/027 |
| 9,157,182 B2 * | 10/2015 | Campbell | ............. | B26D 5/007 |
| 9,746,914 B2 * | 8/2017 | Aonuma | ................ | G06F 9/453 |
| 9,898,868 B2 * | 2/2018 | Aonuma | ............... | G06T 19/006 |
| 10,007,350 B1 * | 6/2018 | Holz | ....................... | G06F 3/017 |
| 10,194,990 B2 * | 2/2019 | Amanatullah | ......... | A61B 17/16 |
| 2004/0129121 A1 * | 7/2004 | Plumley | ................... | B26D 5/00 83/49 |
| 2008/0273175 A1 * | 11/2008 | Gallucci | .................. | B26D 5/00 353/28 |
| 2013/0104380 A1 * | 5/2013 | Felber | ...................... | B26D 7/06 29/557 |
| 2015/0305828 A1 * | 10/2015 | Park | ......................... | G09G 5/14 345/629 |
| 2016/0062118 A1 * | 3/2016 | Osterhout | .......... | G02B 27/0172 345/8 |
| 2016/0132046 A1 * | 5/2016 | Beoughter | ......... | G05B 19/4184 700/17 |
| 2016/0158937 A1 * | 6/2016 | Kamoi | ................... | B25J 9/1697 700/259 |
| 2017/0061200 A1 * | 3/2017 | Wexler | ............... | G06K 9/00255 |

FOREIGN PATENT DOCUMENTS

| | | | | |
|---|---|---|---|---|
| GB | 2385734 A * | 8/2003 | ............. | B26D 5/00 |
| WO | 2005045729 A1 | 5/2005 | | |
| WO | 2006114698 A1 | 11/2006 | | |
| WO | WO-2009105893 A1 * | 9/2009 | ............... | B26D 5/34 |

OTHER PUBLICATIONS

Caudell T P et al: "Augmented reality: an application of heads-up display technology to manual manufacturing processes", System Sciences, 1992. Jan. 7, 1992.

* cited by examiner

SYSTEM FOR CUTTING OF CUTTING STOCK

CROSS REFERENCE TO RELATED APPLICATIONS

This application claims priority to European Patent Application No. 16176288.5, which was filed in the European Patent Office on Jun. 24, 2016, and which is herein incorporated by reference in its entirety.

The invention relates to a system and a method for cutting substantially planar cutting stock, in particular paper, paperboard, corrugated cardboard, film, textile, plastic, leather, metal, foam, or wooden slabs or sheets, according to claim 1 or claim 14, respectively.

Devices for cutting rigid or flexible planar cutting stock are known from the prior art. They typically contain a cutting unit having a horizontal cutting table for depositing the cutting stock. Cutting stock is generally to be understood as rigid or flexible planar cutting stock, for example, a slab made of paperboard, corrugated or solid cardboard, a sheet made of film or paper, a material such as leather or woven fabrics, a plastic, foam, vinyl, PVC, acrylic, or wooden slab or a corresponding sheet. The thickness of such a cutting stock, which can also be unrolled from a roll, is, for example, less than 1 μm or up to greater than 10 cm.

A cutting tool is guided above the cutting table, this cutting tool being able to be displaced within a usually rectangular cutting region, which preferably completely covers the area of the cutting stock, in parallel to the cutting stock, usually along two perpendicular axes, by means of multiple motors. The cutting tool is in particular arranged on a displaceable cutting head, which is equipped with a camera and/or a suction unit, for example. To engage the cutting tool partially or completely with the cutting stock, the cutting tool is preferably displaceable perpendicularly thereto.

The cutting tool can be designed as a static blade having fixed or variable blade contact pressure, for example, for cutting film, polypropylene, or paperboard, as an in particular pneumatically or electrically driven, for example, oscillating blade, for example, for cutting light foam, corrugated cardboard, leather, foam, rubber, or felt, as a rotating blade, for example, for cutting fibrous material such as textiles, mesh, or balloon silk, as a milling tool for cutting rigid material such as hard foam, acrylic, composite material, or wood, or as a creasing tool for producing creases in particular in corrugated cardboard, polypropylene, or solid paperboard. In addition, it is possible to design the cutting tool as a laser, compressed air, or water jet cutting tool or as another tool, in particular as a stamping tool, which is suitable for the chip-removing or chipless, partial or complete severing of the cutting stock or for producing cutting paths or holes.

To prevent slipping of the cutting stock during the cutting, cutting units known from the prior art provide a cutting underlay on the cutting table, to which a partial vacuum can be applied from the underside, so that the cutting stock is fixed on the cutting table.

In the known cutting units, the cutting tool is freely activatable by means of an electronic controller, so that it is possible to cut nearly arbitrarily shaped, for example, two-dimensional, but also three-dimensional segments from printed or unprinted cutting stock. The cutting paths can be freely programmed by means of a computer.

Such cutting units, which are also known as "digital cutters", are used in particular in the field of the graphics industry for creating displays for advertising purposes and shaped adhesive films, for example, for producing traffic sign inscriptions, in the field of the packaging industry for producing collapsible cardboard packaging, in the clothing industry for creating fabric or leather blanks, or in the furniture industry during the production of wooden or plastic blanks, in particular acrylic blanks. Such a cutting unit is, for example, the "G3 DIGITAL CUTTER" from ZÜND Systemtechnik AG in Altstätten, Switzerland, having a working region of up to 3200×3200 mm.

Both the transportation and the depositing of the cutting stock on the cutting table, as well as the removal of the cut cutting stock from the cutting table represent special demands. To facilitate the transfer of the cutting stock, numerous cutting units have a conveyor belt stretched over the cutting table, which is displaceable along one direction. The conveyor belt is used in this case as a cutting underlay and functionally forms the cutting table with its upper side. To hold the upper side of the conveyor belt horizontal and flat, the conveyor belt is preferably guided with its upper side over a flat underlay. It is possible by means of the conveyor belt to guide the cutting stock into the cutting region of the cutting tool and back out again.

During the depositing of the cutting stock, it is often important to place the cutting material according to a setpoint position. In particular in the case of manual depositing, the user is instructed in this case by corresponding setpoint position information. An easily accessible and intuitive provision and progressive update of this information for the user would be advantageous here.

In addition, cutting devices are known from the prior art, which have checking means, which are used to inspect the cutting stock with respect to certain quality features before the cutting procedure. One possible sequence can provide in this case: The cutting stock is examined in an upstream process and classified into quality zones and flaws. The previously marked zones are then acquired using a checking means on the cutting device and if necessary visualized by means of visualization means (projector). For example, material flaws or zones of different quality in a cutting stock (in particular leather here) can thus be input and automatically taken into consideration during the cutting procedure, for example, by omitting flaws or by cutting parts to be cut having high quality demands in a targeted manner out of the previously ascertained regions of high quality. The individual parts to be cut can be made recognizable on the cutting stock in this case by means of visualization (for example, by a projector installed above the table, which displays, for example, the contours of the cutting lines provided for the parts, inter alia), so that the respective positions of the individual parts can be checked by the operator and altered if needed. This known visualization means has the disadvantage that it is relatively complex and is susceptible to failure in the rough operating environment and is therefore costly.

The removal or sorting of the cut material, which is composed of a variety of non-coherent or partially coherent segments depending on the selected cut, can be performed manually or automatically depending on the complexity of the cut and quality requirements.

If cut pieces of different types or categories are provided after the cutting, devices are known from the prior art with respect to manual sorting, which have a projector, which marks the cut pieces differently for a user, for example, by color, using symbols, and/or using text. On the basis of this information relevant to the cut parts, i.e., for example, depending on the marking projected on the cut piece, the user knows which category the respective cut part belongs to and therefore into which tray it is to be sorted. These known projectors have the disadvantage that they are relatively complex and particularly susceptible to failure in the rough operating environment and therefore costly.

The object of the invention is therefore to provide an improved system for cutting planar cutting stock, in particular paper, paperboard, corrugated cardboard, film, textile, plastic, foam, or wooden slabs or sheets.

A further object of the invention is therefore to provide a system for cutting planar cutting stock, in particular paper, paperboard, corrugated cardboard, film, textile, plastic, foam, or wooden slabs or sheets, which enables improved provision of cutting-stock-related information for a user.

A further object of the present invention is to provide a system for cutting planar cutting stock, which enables improved user guiding.

This object is achieved by the implementation of the features of the independent claim. Features which refine the invention in an alternative or advantageous manner can be inferred from the dependent patent claims.

The system according to the invention for cutting planar cutting stock, in particular paper, paperboard, corrugated cardboard, film, textile, plastic, foam, or wooden slabs or sheets, has a cutting device having a cutting table for depositing cutting stock to be cut and a cutting tool, which is arranged above the cutting table, is displaceable within a cutting region in parallel to the cutting table, and by means of which cutting stock to be cut which is deposited on the cutting table can be processed by cutting in the cutting region. The system furthermore has a memory, which is designed to store cutting-stock-related information, which can be retrieved by means of a data connection from a display device of the system, and a computer unit for computing a position and alignment of the display device in relation to the cutting device, in particular in relation to the cutting table. Said display device has a display screen and is designed to display augmented reality and to be worn by a user and be positioned in the field of vision of the user.

The system is thus designed to display to the user retrieved cutting-stock-related information by means of the display screen in a manner readable by the user in the field of vision of the user, adapted to the position and alignment of the display device in relation to the cutting device, and linked to an actual and/or setpoint position of the cutting stock.

In one advantageous embodiment, the display device is designed as augmented reality spectacles or a head cover, for example, a helmet, having a heads-up display.

The cutting-stock-related information preferably relates to one or more contours to be cut (cutting shapes) and/or one or more identifiers of the cutting stock (for example, related to a unique identification of the cutting stock), and/or one or more registration marks for positioning the cutting tool. Alternatively or additionally, the cutting-stock-related information is related to one or more actual or setpoint positions and/or actual or setpoint alignments of the cutting stock or parts thereof, in particular for the purpose of manual placement of the cutting stock on the cutting table before the cutting by the user. As an additional alternative or further addition, the information is related to a categorization of cut parts, in particular for the purpose of manual sorting, and/or to quality zones of the cutting stock.

In advantageous embodiments, the system is designed to display at least a part of the cutting-stock-related items of information as a graphic, in particular wherein the graphic can be at least partially displayed overlaid in a position-specific manner on the cutting stock. Such graphics are, for example, symbols or color or pattern regions.

Optionally, the system is designed to use such graphics for the graphic identification of quality zones, in particular by means of graphics having different color or pattern and/or contours to be cut, in particular by means of lines, and/or sorting categories, in particular by means of graphics having different color or pattern. In this case, the system is optionally designed such that the display of the graphic identification is performed adapted to the position and alignment of the display device in relation to the cutting device such that, in the field of vision of the user, the graphic identification is displayed overlaid precisely and in a dimensionally-accurate manner to the respective region of the cutting stock. This is advantageously also progressive in the event of a possible change of the position and alignment of the display device in relation to the cutting device, for example, because of movements of the user, who wears the display device, or change of his viewing direction.

In a refinement, the system is designed for user guiding by means of the display screen on the basis of the cutting-stock-related items of information, in particular for guiding the user during the placement of cutting stock on the cutting table and/or sorting cut parts. In this case, the user guiding is advantageously performed by means of graphic symbols, for example, arrows or geometrical characters, which can additionally be animated.

For example, the user can thus place the cutting stock more accurately and/or with less effort on the cutting table adjoining one or two predefined lines on the table, by displaying this line or these lines as artificial lines in the display screen overlaid on reality at the appropriate point. In addition, therefore, for example, items of information with respect to a zone vacuum can also be displayed, so that the user easily recognizes which regions of the cutting table are activated for the vacuum and which are not.

In particularly advantageous embodiments, the display device has a camera for recording live images, for example, single images or in the form of videos. Optionally, in such embodiments, the computer unit is designed to determine position and alignment of the display device in relation to the cutting device on the basis of at least one live image, which is recorded by the camera, of at least one part of the cutting device used as a position reference. For this purpose, as an option, the cutting device has optical markings, which are used as the position reference and/or the determination is progressively performed on the basis of progressively recorded live images and/or the determination is performed by means of resection.

Alternatively or additionally, in embodiments having a camera, the system is designed to carry out a registration of the respective cutting stock to be cut automatically on the basis of one or more recorded live images of the cutting stock by means of image processing, in particular on the basis of a barcode or a serial number. The respective cutting stock can therefore be input by the system. Additionally or alternatively, a recognition of the cutting stock type and/or the cutting stock material of the cutting stock to be cut is performed, in particular on the basis of a color, structure, and/or surface composition of the cutting stock. As a further option, a determination of the actual position of the deposited cutting stock on the cutting table is performed, which is used for positioning of the cutting tool. This advantageously enables the depositing of the cutting stock on the cutting table to be performed comparatively inaccurately and/or with greater tolerance, which simplifies an automatic or manual feed.

Alternatively or additionally, a recognition of quality zones of the cutting stock, i.e., an automatic determination of regions which correspond to a certain material quality, can be performed on the basis of a camera image. Alternatively, items of information in this respect can already be provided stored (i.e., predefined) as assumptions (for example, in the case of leather hides, good qualities are typically each present at the same points and comparatively poor qualities are each present at the same points). As a result, on the basis of quality data which is thus obtained or is predefined on the basis of corresponding assumptions, subsequently cutting-stock-related information can be displayed to the user, which is specific for the cutting stock to be cut, i.e., specific for the respective exemplar, the type, or the material or the quality.

As a further option, the system is designed for control of the cutting device by the user by means of the display device, preferably by means of gesture control if a display device having camera is provided, or also by means of operating elements, for example, buttons, on the display device.

In some embodiments, the cutting table comprises a conveyor belt and the cutting device has a drive for driving the conveyor belt, by means of which the cutting stock to be cut, which rests on the cutting table, is transportable in an in particular substantially horizontal direction on the cutting device, in particular into and/or out of the cutting region.

In refined embodiments, the system comprises a sensor unit and the system, in particular the computer unit, is designed to compute a position and alignment of the display device in relation to the cutting device on the basis of measurement data of the sensor unit. The sensor unit preferably has an inertial measurement unit, in particular having an acceleration sensor and/or a gyroscope, and/or a depth sensor and/or a distance meter and/or a GNSS receiver and/or a compass.

The present invention additionally relates to a method for cutting processing of planar cutting stock, in particular paper, paperboard, corrugated cardboard, film, textile, plastic, foam, or wooden slabs or sheets, using a cutting device, wherein the cutting device has a cutting table for depositing cutting stock to be cut and a cutting tool, which is arranged above the cutting table, is displaceable within a cutting region in parallel to the cutting table, and by means of which cutting stock to be cut which is deposited on the cutting table can be processed by cutting in the cutting region. In the scope of the method, by means of a display screen of an augmented reality display device, preferably designed as spectacles or a heads-up display, which is designed to be worn by a user, cutting-stock-related information is displayed to a user in a manner readable by the user in the field of vision of the user, adapted to the position and alignment of the display device in relation to the cutting device, and linked to an actual and/or setpoint position of the cutting stock.

The invention furthermore relates to a computer program product having program code, which is stored on a machine-readable carrier, for controlling and/or carrying out the method according to the invention, in particular when the program is executed on an electronic data processing unit designed as a control unit of a system according to the invention.

The device according to the invention will be described in greater detail hereafter solely by way of example on the basis of specific exemplary embodiments which are schematically illustrated in the drawings.

Figure 3A:
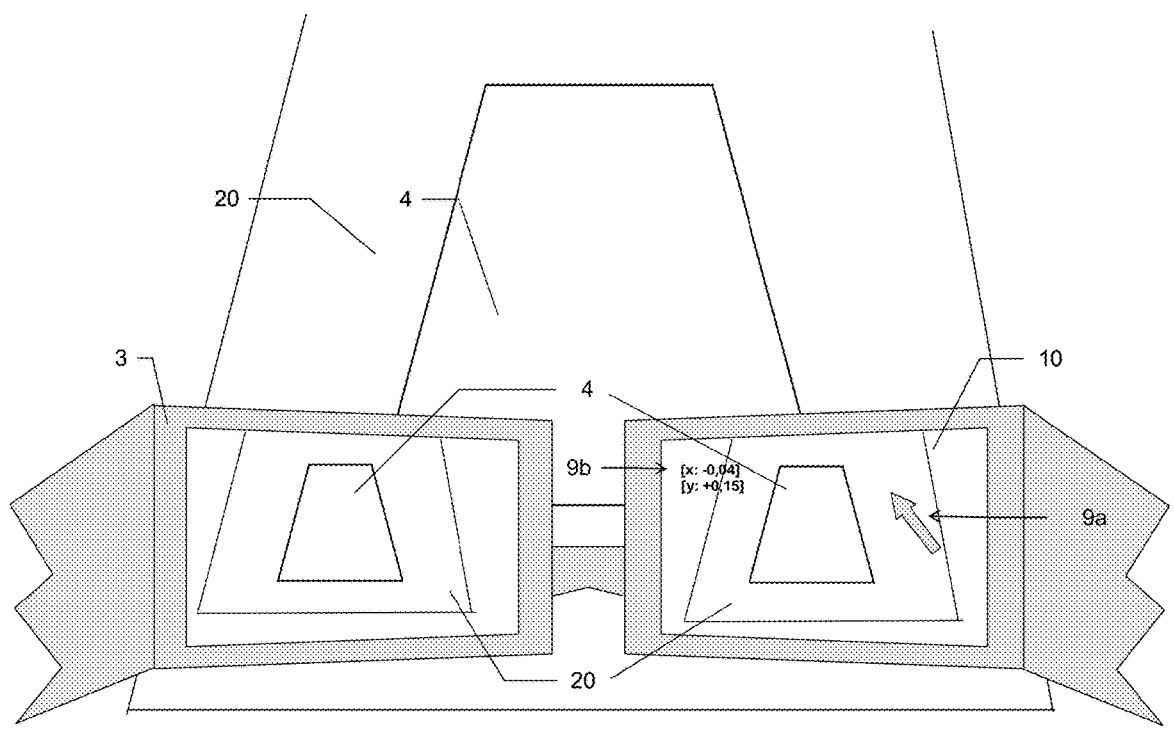
Figure 3B:
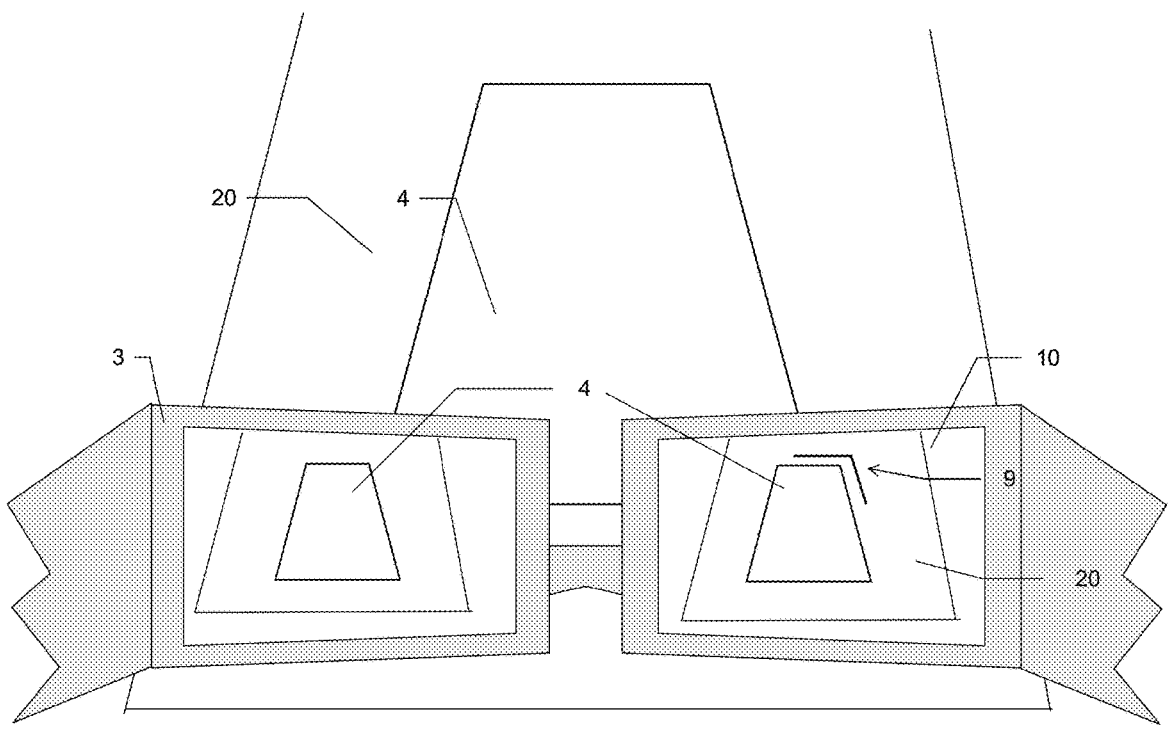
Figure 3C:
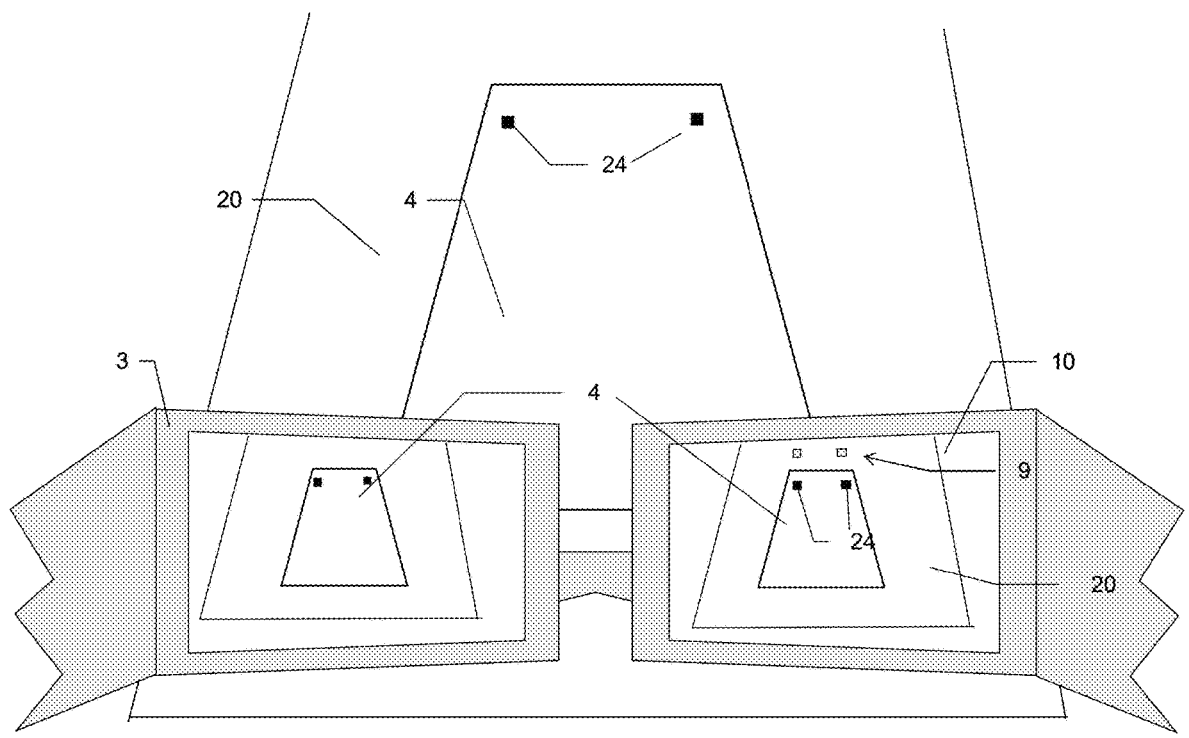
Figure 4:
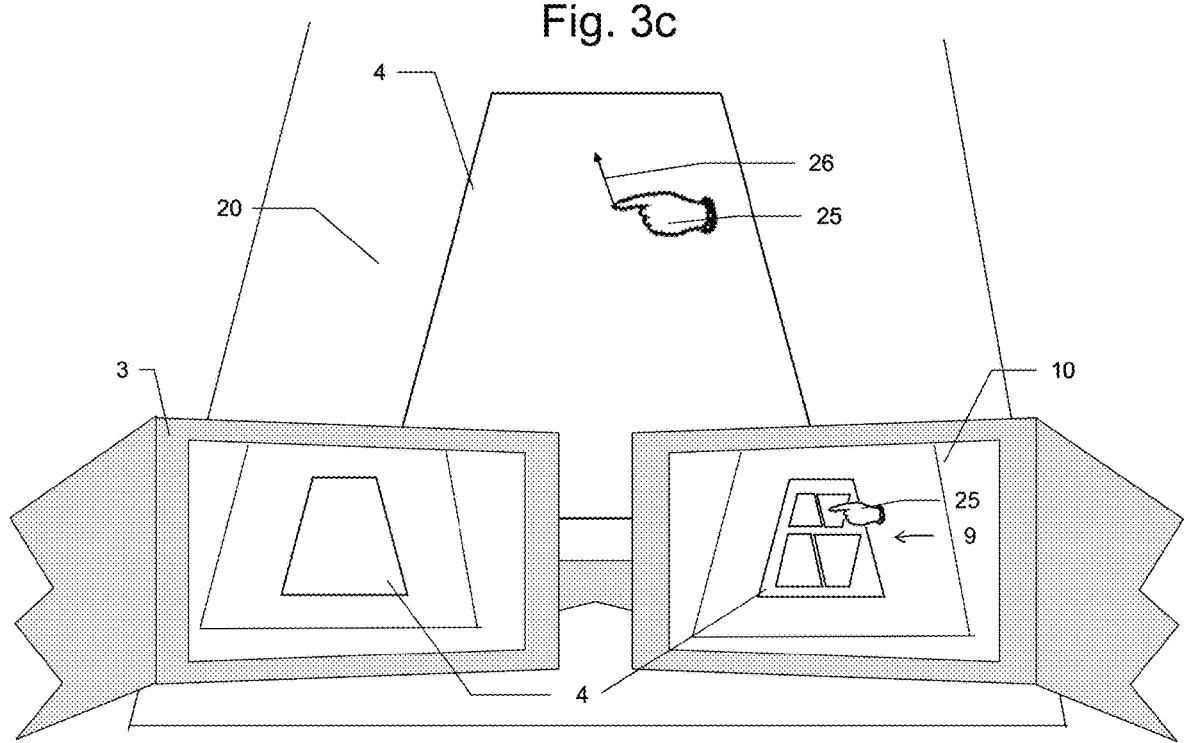
Figure 5:
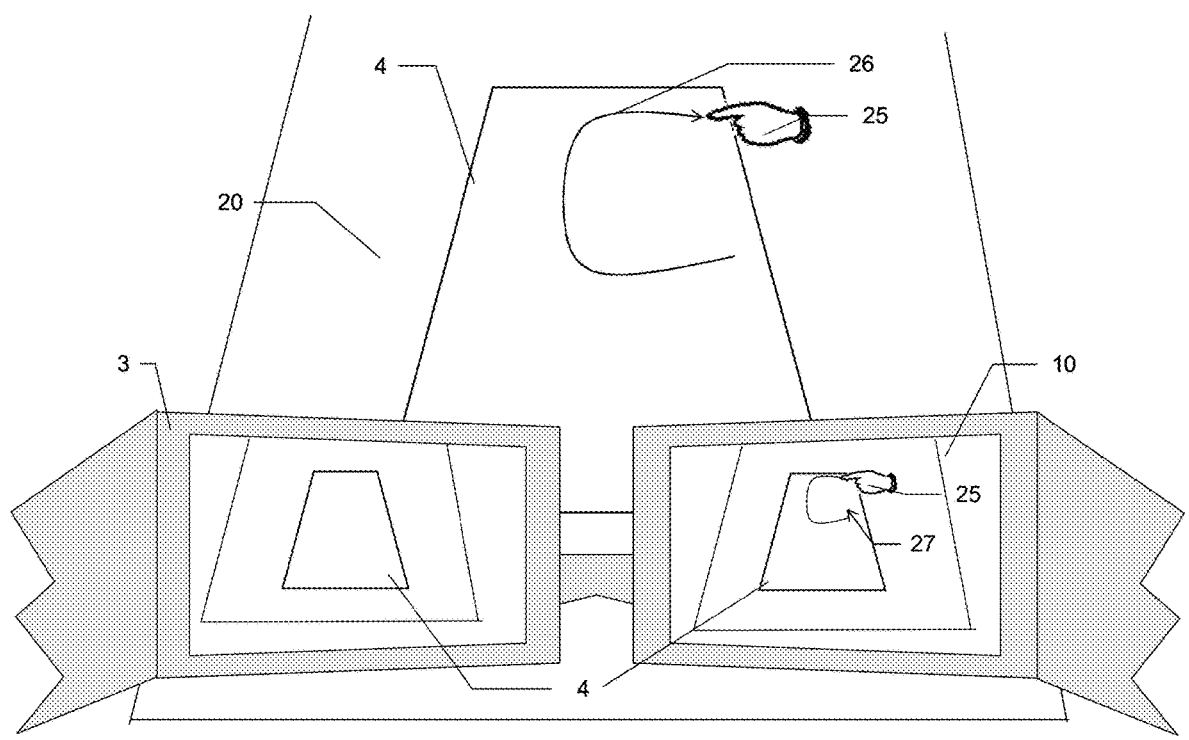
Figure 6:
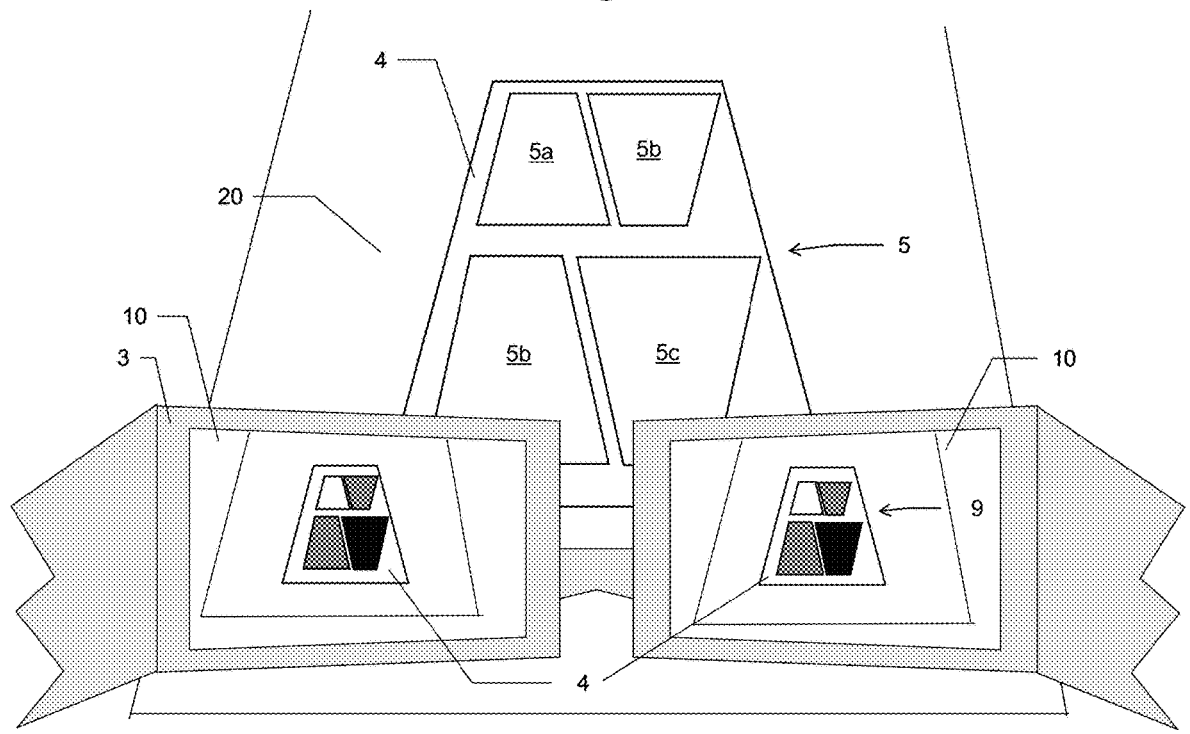

FIGS. 3*a-c* show examples of a display of cutting-stock-related information in conjunction with a setpoint position of the cutting stock;

FIG. 4 shows a further example of a display of cutting-stock-related information;

FIG. 5 shows a further example of a display of cutting-stock-related information; and FIG. 6 shows a last example of a display of cutting-stock-related information.

Figure 1:
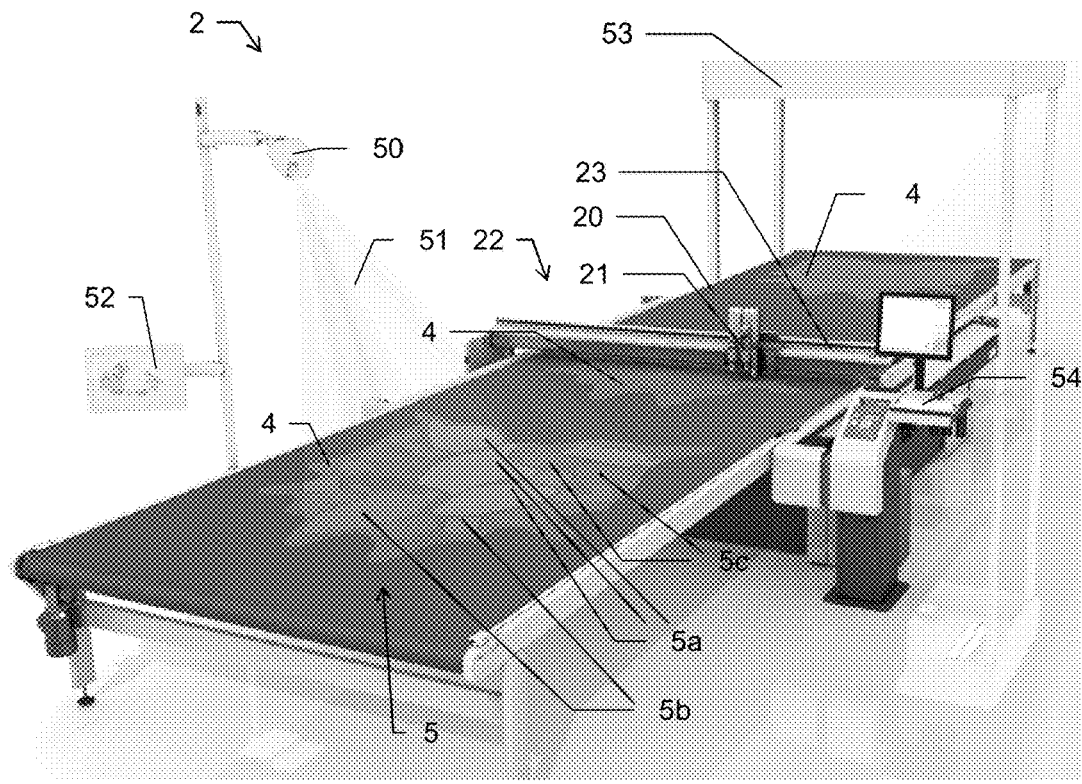
FIG. 1 shows an oblique view of a cutting device of the prior art.

FIG. 1 shows a cutting device 2 of the prior art for cutting planar cutting stock, in particular paper, paperboard, corrugated cardboard, film, textile, plastic, foam, or wooden slabs or sheets, in an oblique view. The device 2 is divided into a cutting table 20, which has a conveyor belt in the example and on which three leather hides rest as cutting stock 4 in the exemplary embodiment shown, and a cutting tool 21 on a guide rail 23. By means of a control unit 54, at least the drives of a cutting head, on which the cutting tool 21 is arranged, for displacing the cutting head, and optionally a drive for driving the conveyor belt can be activated. In the example, the device additionally has a checking means 53, using which a deposited cutting stock 4 to be cut can be optically analyzed, for example, to determine various quality zones of the leather hide, which are then taken into consideration in a targeted manner for the cutting procedure, by selecting an arrangement, which is optimized with respect to the existing quality regions, of the cutting parts to be cut on the leather hides.

The cutting tool 21 is arranged above the cutting table and above the resting cutting stock 4, and is displaceable within a cutting region 22 in parallel to the cutting table 21, i.e., substantially horizontally, along two horizontal axes perpendicular to one another. The cutting tool 21 is preferably also vertically displaceable, to engage it with the cutting stock 4—optionally at different engagement depths. By means of the cutting tool 21, cutting stock 4 to be cut (in the image the leather hide located on the top right) which is deposited on the cutting table can be cut in the cutting region 22 into individual cut pieces 5. The contours of the cut pieces 5 are stored in this case in a memory of the device 2, for example, as part of the control unit 54, and form the foundation for a cutting plan. The horizontal movement of the cutting tool 4 then occurs depending on the cutting plan, i.e., the arrangement of the contours on the respective cutting stock 4. If the cutting stock 4 is placed on the cutting table 20, it assumes a defined position and alignment in relation to the cutting table 20 and/or to the cutting device. In order that the cutting occurs at the correct points of the cutting stock 4, this placement either has to be performed on a setpoint position or the actual position of the cutting stock 4 in relation to the cutting table 20 has to be ascertained before the cutting, for example, by optical detection. In other words, for a correct cut, the initial position relationship between cutting stock 4 and cutting device has to be established.

In the front region of the figure, cutting stock 4 is shown, which has been completely cut into individual cut parts 5, so that the individual cut parts 5 are ready to be removed from the cutting table 20, wherein this sorting is performed manually in the example. In accordance with the above-described division of the cutting stock 4 into different quality zones, cut pieces 5*a*-5*c* of different quality, and/or, for example, also different geometry (such as identical parts once for shoe size 38 and once for shoe size 39, which the operator otherwise practically cannot differentiate) are provided after the cutting. For example, the cut parts 5a are parts of highest quality, cut parts 5b are parts of moderate quality, and cut parts 5c are those of lowest quality. The cutting device has a projector 50 in the example, which illuminates the cut parts 5 in a targeted manner by means of light beams 51 of various colors with a different color depending on the quality category, so that the user can recognize on the basis of the illumination color which category the respective cut part belongs to. In FIG. 1, the color is lighter the better the quality. Because in devices of the prior art, the quality display projection is not always sufficiently recognizable for the user for various reasons, the device additionally has to have a display screen 52, which displays a categorizing image of the cut cutting stock 4. However, the assignment of a respective part to a category on the basis of a display screen display is made more difficult for the user in comparison to color projection, because he first has to compare the provided cutting stock 4 to the displayed image and has to identify the association.

Figure 2:
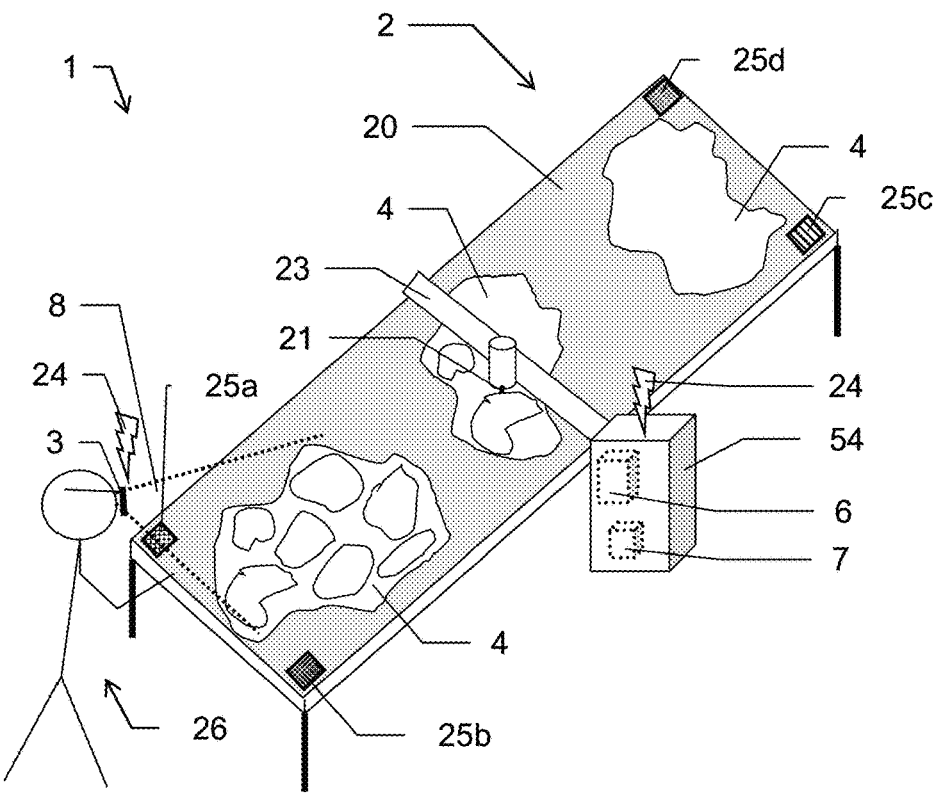
FIG. 2 shows a schematic oblique view of a system according to the invention.

FIG. 2 shows a system 1 according to the invention for cutting planar cutting stock 4. The system 1 has a cutting device 2 having a cutting table 20, which optionally comprises a conveyor belt, a control unit 54, and a cutting tool 21 on a guide rail 23, similarly to that from FIG. 1. In addition, the system has a display device 3 having a display screen for displaying augmented reality, designed in the example as augmented reality spectacles, which is worn by the user 26 on the head, so that the display screen or the display device 3 is positioned in the field of vision 8 of the user 26. Alternatively, the display screen is designed as a heads-up display. The advantage of such embodiments of the display device 3 is that the user 26 also has both hands free when wearing the display device 3. Optionally, the display device 3 has an eye tracker, using which the viewing direction of the user 26 is determined, whereby items of information are possibly displayed adapted to the viewing direction.

The display screen is used in a manner known per se for displaying information in a manner readable to the user in his field of vision 8, which is overlaid on his view of the surroundings, in this case especially his view of the cutting device 2 and/or the cutting stock 4. According to the invention, the information is cutting-stock-related information, for example, information about an actual or setpoint position of the cutting stock or parts thereof or about cutting contours. The information is retrieved progressively or in a targeted manner as needed by means of a data connection 24, for example, a wireless connection, from a memory 6, which is housed in the example in the control unit 54, by the display device 3.

The display of the cutting-stock-relevant information is performed in this case according to the invention depending on and/or adapted to the position and alignment of the display device 3 in relation to the cutting device 2 and/or in relation to the cutting table 20, for example, adapted such that information is only displayed when the cutting device 2 or the cutting table 20 is in the field of vision 8 or the positioning of the information on the display screen is dependent on the relative position or relative alignment of the display device 3 and, for example, the positioning is progressively adapted thereto. For this purpose, the system has a computer unit 7, which is housed in the control unit 54 in the example, for computing just this position and alignment. The display device 3 preferably has a camera for recording a live image. The computation of the position is then performed by means of image processing of the recorded live image in a manner known per se, from which distinctive and specific features of the cutting table are extractable and on the basis of which, for example, by means of resection, the position and alignment of the camera and therefore the display device 3 are computed. For this purpose, as shown in the example, the cutting device 2 can have special optical markings 25a-25d, the location and/or arrangement of which are known and stored in the memory 6 and which are therefore used as a position reference. Alternatively or additionally to a feature-based determination of the relative position and alignment, the system 2 can also have further sensors for this purpose, which can be arranged in the display device 3, for example, an inertial measurement unit (IMU or INS as an abbreviation for inertial navigation system), compass, inclination sensors, a depth sensor such as an RIM camera or strip projection camera, etc. In general, further methods normally known to a person skilled in the art for indoor navigation can also be used here, such as WLAN-based, RFID-based, and/or Bluetooth-based location, etc.

The display of the cutting-stock-related information is additionally performed linked to a position of the cutting stock 4. In the example, the already cut cutting stock 4 is in the field of vision 8 of the user 26 and the display screen displays the information in relation to the location of this cutting stock 4, for example, by not displaying a graphic symbol at any arbitrary or fixed point on the display screen and therefore in the field of vision 8 of the user 26, but rather so that it can be read by the user overlaid on the cutting stock at a certain point. The actual position of the cutting stock 4 is ascertained in this case by image processing of a recorded live image or proceeding from a previously known location of the cutting stock 4 on the cutting table on the basis of the computed position and alignment of the display device 3 in relation to the cutting table 20.

FIG. 3a shows a first example of the display of cutting-stock-relevant information. The view of the user through the display device 3, which is designed as augmented reality spectacles, on a part of the cutting table 20 is shown, on which the cutting stock 4 to be cut is to be positioned, which the user also observes through the lenses of the spectacles. In addition to this view of his surroundings located in the field of vision, the user sees, by means of the spectacle lens used as the display screen 10, a display of cutting-stock-related information 9, which is displayed by the display device 3 so that the user can see it sharply and therefore can read it (for example, by means of a small projector as part of the display device, which projects the information 9 on the lens).

In the example, the cutting-stock-related information 9 is related to a setpoint position of the cutting stock 4, which it is to assume for the subsequent cutting procedure. The display of the cutting-stock-related information is performed linked to the actual position of the cutting stock 4. This actual position deviates in relation to a coordinate system aligned to the cutting table 20, for example, in the x direction by −0.04 units and in the y direction by +0.15 units, from the setpoint position, which is displayed to the user as text information 9b in the top left of the display screen. In addition, an arrow is displayed as graphic cutting-stock-related information 9a, which indicates in which direction he has to manually shift the cutting stock so that the setpoint position is reached. Such a graphic is optionally additionally animated. The text information 9b and the arrow 9a are progressively adapted in the example depending on the ascertained deviation of the actual position from the setpoint position, the arrow 9a, for example, by changing its direction and length.

FIG. 3b is a variation of FIG. 3a. The setpoint position is graphically displayed here as two lines as cutting-stock-related information 9a, which identify the setpoint position to be assumed. In this case, in the example, the location of these lines 9 in relation to the viewed image 20 of the cutting table 20 is fixedly maintained, for which purpose the location of the lines 9a on the display screen 10 is changed if needed, depending on whether the viewing direction of the user and/or the alignment of the display device 3 in relation to the cutting table 20 changes. If the user looks further forward, for example, the cutting-stock-related information 9, which is linked to the setpoint position of the cutting stock 4, travels farther downward in the display screen.

FIG. 3c is a further variation of FIG. 3a. In this example, the cutting stock 4 is, for example, a printed sheet of paper, which has a print to be cut out (not shown) and is provided with registration marks 24, which are used in a known manner for a precise cut. For manual or also machine depositing on the cutting table 20, these registration marks 24 are used as a positioning aid, by depositing or displacing the sheet such that the registration marks 24 are congruent with graphic marks 9, which are displayed in the display screen 10 as linked to the setpoint position. The display of the cutting-stock-related information 9 can be used as a control means, to check the correct position of the cutting stock 4 and/or as a user guide during manual depositing of the cutting stock 4.

FIG. 4 shows a further example of the display of cutting-stock-relevant information. A portion of the cutting table 20 having deposited cutting stock 4 and the view of the user thereon through the display device 3 are again shown in the figure. Augmented reality is created in the display screen 10 in that contours 9 to be cut are displayed overlaid on the cutting stock 4, which contours have been selected by the control unit for this stock 4. The user can thus check whether the selected cutting contours are appropriate, for example, optimally adapted to the cutting stock 4. The user can optimize the positioning of the cutting stock 4 with respect to the contours if necessary.

FIG. 4 furthermore shows how, alternatively or additionally, the system according to the invention enables the user to arrange the contours to be cut in an optimized manner on the cutting stock 4 via gesture control. For example, by means of image processing of live images of a camera (not shown) of the display device 3, a recognition of the movements of the hands 25 of the user is performed, which he executes on the cutting stock 4 (for example, a pushing or pulling movement with the index finger, symbolized by the arrow 26) and whereby he virtually shifts and/or changes the cutting contours 9 displayed to him so that a new virtual arrangement of the cutting contours 9 results, which is registered by the control unit and stored as a new cutting pattern, on the basis of which the cutting is subsequently performed.

FIG. 5 shows a further form of the control of the cutting device by the user by means of the display device 3. It has a camera (not shown) for the progressive recording of live images. As in the example according to FIG. 4, a recognition of the hand movements 26 of the user hand 25 is performed by means of image processing. In the present example, these are used to define regions of the cutting stock 4. In the example, the user has defined a first region 27 by the hand movement, which is stored in the control unit. For example, zones of different quality of the material to be cut or flawed regions to be left out may thus be communicated in a simple manner by the user to the system, whereby subsequently a cutting procedure adapted to the quality zones or flawed regions can be performed automatically.

Alternatively or additionally, a definition of quality or flawed regions is performed on the basis of a live image recorded by the display device 3 by means of corresponding algorithms, which the system has. As further options, a live image is used to automatically carry out a registration or recognition of the cutting stock 4 or the cutting stock type, for example, by means of a barcode or serial number imprinted on the cutting stock 4 or on the basis of a composition of the cutting stock 4, for example, its color, structure, or shape, or a surface composition. Optionally, subsequently to the registration or recognition, the display of cutting-stock-related information is at least partially performed specifically on the registered or recognized cutting stock 4, for example, by displaying to the user items of information for the optimum manual handling of the cutting stock 4 or information relating to a cutting tool to be selected for this cutting stock 4.

FIG. 6 shows a further example of the display of cutting-stock-relevant information. A portion of the cutting table 20, on which a cutting stock 4 already cut into parts 5 rests, and the view of the user thereof through the display device 3 are shown. In this example, both lenses of the spectacles are used as the display screen 10. The cutting stock 4 has parts 5 of different categories 5a-5c. Categories can be defined, for example, with respect to quality, component group, or the like. For example, in the case of natural materials such as leather as the cutting stock 4, the quality is often not consistent over the entire surface, but rather the cutting stock 4 has different quality zones, whereby different qualities also result on the part of the cut parts 5. To display the respective category 5a-5c to the user, in the display screen 10, the respective cut parts are overlaid precisely and in a dimensionally-accurate manner with a graphic identifier 9, in the example, with different colors, depending on the category association. The user is therefore capable, thanks to this type of user guiding, by looking at the cutting stock 4, on the basis of the coloration as augmented reality, of immediately assigning a respective cut part to the correct category (for example, white for category 5a, gray for 5b, and black for 5c), which is particularly advantageous for manual sorting into containers of the respective category. It is furthermore advantageous that this is achieved without having to make use of an external projector as in the prior art (cf. FIG. 1).

The overlaid display of the identifying graphic 9 is advantageously performed adapted or linked to the position and alignment of the display device 3 to the cutting table 20 and to the position of the cutting stock 4 so that the dimensionally-accurate and precise overlay is also progressively maintained in the event of a change of the head position or viewing direction of the user, i.e., a change of the relative position and alignment of the spectacles 3, by dynamically adapting the display of the graphic 9 (adaptation of the size and/or positioning of the graphic 9 on the display screen 10).

It is additionally possible according to the invention to combine the features of the individual exemplary embodiments with one another or with the known prior art, if not otherwise indicated.

The invention claimed is:

1. A system made of an electronic mobile display device having a display screen for displaying augmented reality, an electronic memory, and a cutting device for cutting of cutting stock, wherein the cutting device comprising:
  a cutting table for depositing cutting stock to be cut; and
  a cutting tool, which is arranged above the cutting table, is displaceable within a cutting region in parallel to the cutting table, and by means of which cutting stock to be cut, the cutting stock being deposited on the cutting table, can be processed by cutting in the cutting region,
the memory is configured to store cutting-stock-related information, which is retrievable by a data connection by the display device,
the system has a computer unit configured to compute a position and alignment of the display device in relation to the cutting device,
the display device is configured to be worn by a user and positioned in the field of vision of the user,
the system is configured to display to the user retrieved cutting-stock-related information on the display screen in a manner
  readable by the user in the field of vision of the user,
  adapted to the position and alignment of the display device in relation to the cutting device,
  linked to an actual or setpoint position of the cutting stock, and wherein the cutting-stock-related information is related to at least one of: one or more contours to be cut one or more identifiers of the cutting stock, one or more registration marks for positioning the cutting tool, one or more actual or setpoint positions and/or actual or setpoint alignments of the cutting stock or parts thereof, a categorization of cut parts, or quality zones of the cutting stock.

2. The system according to claim 1, wherein the display device is designed as augmented reality spectacles or a head cover having heads-up display.

3. The system according to claim 1, wherein the system is configured to display at least a part of the cutting-stock-related items of information as a graphic.

4. The system according to claim 3, wherein the graphic is displayable at least partially overlaid on the cutting stock in a position-specific manner.

5. The system according to claim 3, wherein the system is configured for the graphic identification of:
  quality zones,
  contours to be cut, or
  sorting categories.

6. The system according to claim 5, wherein the system is designed for the graphic identification of quality zones by means of graphics having at least one of different colors or patterns, contours to be cut by means of lines, sorting categories by means of different colors different text, or different symbols.

7. The system according to claim 5, wherein the system is configured such that the display of the graphic identifier is adapted to the position and alignment of the display device in relation to the cutting device such that in the field of vision of the user, the graphic identifier is displayed overlaid on the respective region of the cutting stock precisely and in a dimensionally-accurate manner.

8. The system according to claim 7, wherein the system is designed such that the display of the graphic identifier is performed adapted to the position and alignment of the display device in relation to the cutting device such that in the field of vision of the user, the graphic identifier is displayed overlaid on the respective region of the cutting stock precisely and in a dimensionally-accurate manner, also progressively upon possible change of the position and alignment of the display device in relation to the cutting device.

9. The system according to claim 1, wherein the system is configured to be guided by the user using the display screen on the basis of the cutting-stock-related items of information.

10. The system according to claim 9, wherein the system is designed for guiding the user during at least one of the placement of cutting stock on the cutting table and sorting cut parts.

11. The system according to claim 10, wherein the user guiding is performed by means of graphic symbols.

12. The system according to claim 1, wherein the system has a camera for recording images, wherein the camera is arranged on the display device or in a fixed spatial relationship in relation to the cutting device.

13. The system according to claim 1, wherein the computer unit is designed to determine position and alignment of the display device in relation to the cutting device on the basis of at least one image recorded by the camera of at least one part of the cutting device or the display device used as a position reference.

14. The system according to claim 13, wherein, for the case in which the camera is arranged on the display device, the cutting device has optical markings especially for this purpose, which are used as the position reference or the determination is performed progressively on the basis of progressively recorded images or the determination is performed by means of resection.

15. The system according to claim 1, wherein the system is designed to automatically, on the basis of one or more recorded images of the cutting stock by means of image processing
  carry out a registration of the respective cutting stock to be cut, on the basis of a barcode or a serial number,
  carry out a recognition of the cutting stock type and/or the cutting stock material of the cutting stock to be cut, on the basis of a color, structure, and/or surface composition of the cutting stock,
  carry out a determination of the actual position of the deposited cutting stock on the cutting table, which is used for positioning the cutting tool, or
  carry out a recognition of quality zones of the cutting stock.

16. The system according to claim 15, wherein subsequently cutting-stock-related information, which is specific for the cutting stock to be cut, is displayed to the user on the basis of the data thus obtained.

17. The system according to claim 1, wherein the system comprises a sensor unit and the system is designed to compute a position and alignment of the display device in relation to the cutting device on the basis of measurement data of the sensor unit.

18. The system according to claim 17, wherein the sensor unit has at least one of an inertial measurement unit, having an acceleration sensor or a gyroscope, or a depth sensor or a distance meter or a compass.

19. The system according to claim 1, wherein the system is designed for control of the cutting device by the user using the display device.

20. The system according to claim 19, wherein the user control is by means of gesture control if a display device having camera is provided.

21. The system according to claim 1, wherein the cutting table comprises a conveyor belt and the cutting device has a drive configured to drive the conveyor belt, by means of which the cutting stock to be cut, which rests on the cutting table, is transportable into and/or out of the cutting region.

22. The system according to claim 1, wherein the cutting stock is substantially planar cutting stock.

23. The system according to claim 22, wherein the cutting stock is slabs of sheets of paper, paperboard, corrugated cardboard, film, leather, textile, plastic, foam, or wood.

24. The system according to claim 1, wherein the cutting-stock-related information is related to one or more actual or setpoint positions or actual or setpoint alignments of the cutting stock or parts thereof for the purpose of manual placement of the cutting stock on the cutting table before the cutting by the user.

* * * * *